United States Patent
Klein

(10) Patent No.: US 10,154,366 B2
(45) Date of Patent: Dec. 11, 2018

(54) METHOD AND SYSTEM FOR EXCHANGING DATA WITH A MOBILE COMMUNICATION NETWORK USING AT LEAST ONE GROUP OF CLONED SUBSCRIBER IDENTITY MODULES

(71) Applicant: Deutsche Telekom AG, Bonn (DE)

(72) Inventor: Andreas Klein, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 24 days.

(21) Appl. No.: 15/504,328

(22) PCT Filed: Aug. 12, 2015

(86) PCT No.: PCT/EP2015/068539
§ 371 (c)(1),
(2) Date: Feb. 16, 2017

(87) PCT Pub. No.: WO2016/026746
PCT Pub. Date: Feb. 25, 2016

(65) Prior Publication Data
US 2017/0251328 A1   Aug. 31, 2017

(30) Foreign Application Priority Data

Aug. 18, 2014 (EP) .................................. 14181294

(51) Int. Cl.
*H04W 4/08* (2009.01)
*H04W 60/00* (2009.01)
(Continued)

(52) U.S. Cl.
CPC ............ *H04W 4/005* (2013.01); *H04W 4/06* (2013.01); *H04W 4/08* (2013.01); *H04W 4/70* (2018.02);
(Continued)

(58) Field of Classification Search
None
See application file for complete search history.

(56) References Cited

U.S. PATENT DOCUMENTS 8,891,423 B2 * 11/2014 Shaheen ............... H04W 4/005
370/311
2011/0161503 A1 * 6/2011 Krebs ..................... H04W 4/00
709/227
(Continued)

FOREIGN PATENT DOCUMENTS

EP          0669774 A1    8/1995

*Primary Examiner* — Vladimir Magloire
*Assistant Examiner* — Donald H Braswell
(74) *Attorney, Agent, or Firm* — Leydig, Voit & Mayer, Ltd.

(57) ABSTRACT

A method for exchanging data with a mobile communication network using a group of cloned subscriber identity modules includes: receiving, by the mobile communication network, a first attachment request from a user equipment and/or machine type communication (MTC) device corresponding to a second cloned subscriber identity module; rejecting, by the mobile communication network, the first attachment request based on a user equipment and/or MTC device corresponding to a first cloned subscriber identity module still being attached to the mobile communication network, and transmitting, by the mobile communication network, a waiting time information indicative of a waiting time interval to the user equipment and/or MTC device corresponding to the second cloned subscriber identity module; and receiving, by the mobile communication network, a second attachment request from the user equipment and/or MTC device corresponding to the second cloned subscriber identity module after the waiting time interval has elapsed.

13 Claims, 2 Drawing Sheets

(51) Int. Cl.
*H04W 4/00* (2018.01)
*H04W 8/18* (2009.01)
*H04W 60/04* (2009.01)
*H04W 4/06* (2009.01)
*H04W 4/70* (2018.01)

(52) U.S. Cl.
CPC ........... *H04W 8/186* (2013.01); *H04W 60/00* (2013.01); *H04W 60/04* (2013.01)

(56) References Cited

U.S. PATENT DOCUMENTS

2011/0199905 A1* 8/2011 Pinheiro .............. H04W 4/005
 370/235
2012/0252445 A1 10/2012 Lindholm et al.

* cited by examiner

METHOD AND SYSTEM FOR EXCHANGING DATA WITH A MOBILE COMMUNICATION NETWORK USING AT LEAST ONE GROUP OF CLONED SUBSCRIBER IDENTITY MODULES

CROSS-REFERENCE TO RELATED APPLICATIONS

This application is a U.S. National Phase application under 35 U.S.C. § 371 of International Application No. PCT/EP2015/068539, filed on Aug. 12, 2015, and claims benefit to European Patent Application No. EP 14181294.1, filed on Aug. 18, 2014. The International Application was published in English on Feb. 25, 2016 as WO 2016/026746 A1 under PCT Article 21(2).

FIELD

The present invention relates to a method for exchanging data with a mobile communication network using at least one group of cloned subscriber identity modules, especially for transmitting data, especially machine type communication data, between, on the one hand, user equipments and/or MTC devices (machine type communication devices) corresponding to the group of cloned subscriber identity modules, and, on the other hand, the mobile communication network.

The present invention further relates to a system for exchanging data between user equipments and/or MTC devices with a mobile communication network using at least one group of cloned subscriber identity modules, the system comprising the user equipments and/or MTC devices, the group of cloned subscriber identity modules, and the mobile communication network.

The present invention further relates to a user equipment and/or machine type communication device for exchanging data between user equipments and/or MTC devices with a mobile communication network using at least one group of cloned subscriber identity modules.

Furthermore, the present invention relates to a mobile communication network suitable for exchanging data between a plurality of user equipments and/or MTC devices and the mobile communication network in a system according to the present invention, using at least one group of cloned subscriber identity modules.

BACKGROUND

In current mobile communication networks, typically cellular mobile communication networks comprising a plurality of radio cells, subscriber identity modules are used within mobile stations, i.e. user equipments and/or MTC devices, comprising such subscriber identity modules. Currently, many subscriber identity modules are physically realized as hardware subscriber identity modules comprising a physical hardware interface (e.g., "contact pads"), a memory as well as a processor (e.g., "microcontroller" or "microprocessor"). Alternatively, so-called "soft SIMs" (software-based subscriber identity modules) can be used. In any case, subscriber identity modules within mobile stations such as user equipments and/or MTC devices can be regarded as necessary in the context of current mobile communication networks. Currently, each subscriber identity module has an assigned IMSI (International Mobile Subscriber Identity) and an assigned MSISDN (Mobile Subscriber Integrated Services Digital Network Number). In case that the assigned IMSI and/or the assigned MSISDN is or are identical for a plurality of subscriber identity modules, such subscriber identity modules are also called cloned subscriber identity modules.

In a GSM-based (Global System for Mobile communication) communication network, it is possible to clone SIM cards, so that each cloned card has exactly the same IMSI and MSISDN, an example thereof can be found in European patent publication EP 0 669 774 A1. Such cloned SIM cards (or cloned subscriber identity modules) can be given, e.g., to the same subscriber for usage in several devices in parallel or the operator (of the mobile communication network) could use cloned SIM cards (cloned subscriber identity modules) for usage in several different devices at the same time to save resources and costs. The latter can be described as pooling of cloned SIMs (cards) for specific usage scenarios, whereby it is important to save resources (used number of IMSIs and MSISDNs) and costs, which depend on the number of different subscribers in use.

Pools of cloned SIM cards are helpful, if, on the one hand, thousands or even millions of SIM cards are required, like for devices used for machine-to-machine communication, and, on the other hand, each device is only attached for a limited time to the mobile network. This could be a onetime attach to the mobile network or a periodic attach with an important time offset, such as attachment times of a few seconds or about 10, 20 or 30 seconds once every 24, 48, 72 hours or a few days, one or a few weeks, i.e. duty cycles of the order of magnitude of 1E-4, 1E-5 or even 1E-6.

Machine type communication is increasingly used in cellular mobile communication network, as well as in information and telecommunications systems in general. Examples of systems using MTC devices for MTC operations may include:

remotely controlled power meters as well as metering machine type communication devices, remotely controlled machine type communication devices for controlling functions e.g. in a home which make it possible to turn on an heating prior to arriving home.

In addition to such examples of stationary machine type communication, there are also applications of mobile machine type communication, such as remotely monitoring and/or controlling functions or status information in a car, boat, or some other kind of vehicle.

A significant increase in signaling traffic and in data traffic in cellular access systems can be expected due to the vast amount of possible applications for MTC, MTC devices and MTC systems.

An MTC device may be connected through cellular access networks to mobile communication networks, the access networks may include GSM (Global System of Mobile Communication) access networks, GPRS (General Packet Radio System) access networks, and/or EPS/LTE (Evolved Packet System/Long Term Evolution) access networks. Typically, a MTC device will have relatively low mobility, low data consumption and infrequent communication. In addition, many, if not most, types of applications of machine type communication will be delay tolerant, i.e. they will not be real time applications, as opposed to traditional applications of cellular access networks, such as speech, streaming of data etc. In many cases, the application in which a MTC device is used needs the MTC device to report data, or it may happen that the MTC server needs to transmit data to the MTC device.

Cloned SIMs (or sim cards) could, e.g., be used for any kind of meter, like electricity or heating meter, which do not need a permanent access to the mobile communication network, but push the latest figures to a central server only once a day or once a week or the like.

However, the drawback of the use of such pools of cloned SIM cards is that collisions between cloned subscriber identity modules can occur, when the cloned subscriber identity modules (SIM cards) attach to the mobile core network at the same time (i.e. the corresponding user equipment or MTC device, comprising the cloned subscriber identity module, tries to be attached to the mobile communication network). Such collisions will lead to service outage or service degradation. In the worst case the collision could even end in a deadlock situation for (all or part of) the involved SIM cards. Currently, the only possibility to lower the collision probability is to limit the size of each pool of cloned SIM cards, but this limits also the benefit of cloning SIM cards Currently, the core network does not support any means to resolve collisions, when a cloned SIM card tries to attach to the mobile network and one of its clones is already attached to the network. The last attach procedure would either supersede the connection of prior connected SIM card or the connection of both SIM cards might be ambiguous and not reliable.

This possibility that such a collision occurs is increasing with the number of transactions per cloned card and the number clones in the pool (or group of cloned subscriber identity modules). Therefore the usage of cloned SIM cards is limited to scenarios, where only a onetime access of the device containing the cloned SIM card is necessary or where at least the time interval between each attach procedure to the mobile network is long enough. Furthermore the size of the pool is limited as well.

SUMMARY

In an exemplary embodiment, the present invention provides a method for exchanging data with a mobile communication network using a group of cloned subscriber identity modules. The mobile communication network comprises an access network and a core network. The group of cloned subscriber identity modules comprises a plurality of separate subscriber identity modules, each having an assigned International Mobile Subscriber Identity (IMSI) and an assigned Mobile Subscriber Integrated Services Digital Network Number (MSISDN), the assigned IMSI and/or the assigned MSISDN being identical for the subscriber identity modules of the group of cloned subscriber identity modules. The group of cloned subscriber identity modules is associated to a group of user equipments and/or machine type communication (MTC) devices, each of the user equipments and/or MTC devices comprising at least one subscriber identity module of the group of cloned subscriber identity modules. The group of cloned subscriber identity modules comprises a first cloned subscriber identity module and a second cloned subscriber identity module. The method includes: in a first step, receiving, by the mobile communication network, a first attachment request from a user equipment and/or MTC device corresponding to the second cloned subscriber identity module; in a second step, subsequent to the first step, rejecting, by the mobile communication network, the first attachment request based on a user equipment and/or MTC device corresponding to the first cloned subscriber identity module still being attached to the mobile communication network, and transmitting, by the mobile communication network, a waiting time information indicative of a waiting time interval to the user equipment and/or MTC device corresponding to the second cloned subscriber identity module; and in a third step, subsequent to the second step, receiving, by the mobile communication network, a second attachment request from the user equipment and/or MTC device corresponding to the second cloned subscriber identity module after the waiting time interval has elapsed.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
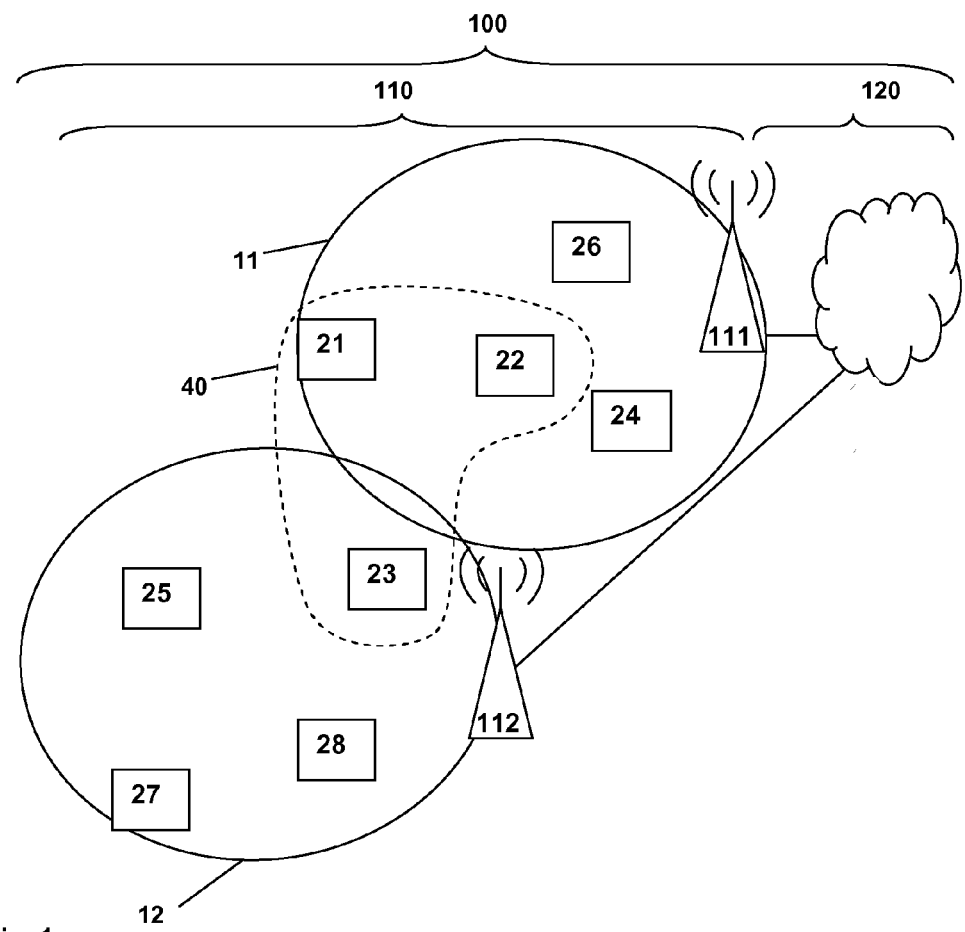
FIG. 1 schematically illustrates a system according to the present invention.

Exemplary embodiments of the present invention provide a method and system for exchanging data, typically machine type communication data, with a mobile communication network using at least one group of cloned subscriber identity modules, a user equipment and/or MTC device and a mobile communication network, wherein the data exchange is enhanced and the additional network load as much as possible reduced, especially with respect to the additional network traffic caused by the transmission of MTC data within the mobile communication network.

In an exemplary embodiment, the present invention provides a method for exchanging data with a mobile communication network using at least one group of cloned subscriber identity modules, the mobile communication network comprising an access network and a core network, wherein the group of cloned subscriber identity modules comprises a plurality of separate subscriber identity modules, each having an assigned IMSI (International Mobile Subscriber Identity) and an assigned MSISDN (Mobile Subscriber Integrated Services Digital Network Number), the assigned IMSI and/or the assigned MSISDN being identical for the subscriber identity modules of the group of cloned subscriber identity modules, wherein the group of cloned subscriber identity modules is associated to a group of user equipments and/or MTC devices (machine type communication devices), each of these user equipments and/or MTC devices comprising at least one subscriber identity module of the group of cloned subscriber identity modules, wherein the user equipments and/or MTC devices are preferably used to exchange—during at least one period of attachment to the mobile communication network—a predetermined volume of data with the mobile communication network, wherein the group of cloned subscriber identity modules comprises at least a first cloned subscriber identity module and a second cloned subscriber identity module, wherein in case that the user equipment and/or the MTC device corresponding to the first cloned subscriber identity module is already attached to the mobile communication network the method comprises the following steps:

in a first step, attachment to the mobile communication network is requested—using the second cloned subscriber identity module—by a corresponding user equipment and/or MTC device sending a first attachment request, in a second step, subsequent to the first step, the first attachment request is rejected by the mobile communication network—as the user equipment and/or the MTC device corresponding to the first cloned subscriber identity module is still attached to the mobile communication network—and a waiting time information indicative of a waiting time interval is transmitted, by the mobile communication network, to the user equipment and/or the MTC device corresponding to the second cloned subscriber identity module, in a third step, subsequent to the second step, attachment to the mobile communication network is requested, by the user equipment and/or the MTC device corresponding to the second cloned subscriber identity module, using a second attachment request, the second attachment request being sent after the waiting time interval has elapsed.

According to the present invention, it is thereby advantageously possible to provide a method for effective usage of pools (or groups) of cloned subscriber identity modules, typically transmitting machine type communication data between, on the one hand, a plurality of user equipments and/or MTC devices, and, on the other hand, a mobile communication network.

According to the present invention, the mobile communication network comprises an access network and a core network, the access network typically comprising a plurality of radio cells, each radio cell having an assigned base station entity, typically a base transceiver station and/or a NodeB entity and/or an enhanced NodeB entity (or eNodeB entity). Normally, such a mobile communication network is used by many thousands if not millions of subscribers having typically subscriber identity modules within their user equipments, such as mobile phones and/or tablet computers and/or laptop computers. According to the present invention, a group of such user equipments and/or MTC devices relates to a group of cloned subscriber identity modules such that each of these user equipments and/or MTC devices comprises at least one such cloned subscriber identity module of the group of cloned subscriber identity modules. This group of subscriber identity modules is a group of cloned subscriber identity modules because each subscriber identity module of this group has the identical assigned IMSI (International Mobile Subscriber Identity) and/or the identical assigned MSISDN (Mobile Subscriber Integrated Services Digital Network Number), wherein preferably both the IMSI and the MSISDN are identical within the group of cloned subscriber identity modules.

The user equipments and/or MTC devices associated to or corresponding to the subscriber identity modules of the group of cloned subscriber identity modules are preferably used to exchange a predetermined volume of data with the mobile communication network. The exchange of data with the mobile communication network requires attachment, with the mobile communication network, of the user equipment and/or MTC device corresponding to one of the cloned subscriber identity modules.

In the context of the present invention, the wording "the subscriber identity module attaches to (or is attached to or requests attachment to) the mobile communication network" is to be understood as meaning "the user equipment/MTC device corresponding to the subscriber identity module attaches to (or is attached to or requests attachment to) the mobile communication network".

Attachment of the subscriber identity modules of the group of cloned subscriber identity modules towards the mobile communication network is typically realized repeatedly, such as every about 24 or 48 or 72 hours. However, it is also possible according to the present invention that such attachment is only performed once, especially in order to exchange credentials related to another subscriber identity module within the respective user equipment and/or MTC device, which other subscriber identity module is provisioned within the mobile communication network by such exchange of credentials.

Typically, the group of cloned subscriber identity modules comprises a certain number of subscriber identity modules, e.g. 10 or 100 or 1,000 or 10,000 or 100,000 or even more subscriber identity modules. Due to the fact that at least one of the IMSI and/or the MSISDN is identical for all those subscriber identity modules, these subscriber identity modules are hard to distinguish from the point of view of the mobile communication network; a situation of collision—i.e. in case that a first of such cloned subscriber identity modules is attached to the mobile communication network and another ("a second") of such cloned subscriber identity modules requests attachment to the mobile communication network—can occur, leading to error situations within the mobile communication network and/or the user equipments/MTC devices concerned.

Therefore, according to the present invention, in case that the user equipment and/or the MTC device corresponding to the first cloned subscriber identity module is attached to the mobile communication network, if—in a first step—a second cloned subscriber identity module requests attachment to the mobile communication network (via a first attachment request), the mobile communication network rejects—in a second step—the attachment request, adding a waiting time information indicative of a waiting time interval. After the waiting time interval has elapsed, the second cloned subscriber identity modules requests attachment to the mobile communication network via a second attachment request.

By sending the waiting time information (indicating the waiting time interval) to the user equipment and/or MTC device corresponding to the second cloned subscriber identity module, it is advantageously possible, according to the present invention, that—in such situations of collisions involving cloned subscriber identity modules—any unnecessary network load due to repeated additional attachment requests (that would need to be rejected, at least to a large extent, prior to the expiration of the waiting time interval) is avoided as well as unnecessary battery drain of the respective user equipments/MTC devices avoided.

According to the present invention two functions are used in order to allow the use of bigger pools (or groups) of cloned cards without service interruption or degradation:

Detection of a possible collision of two clone within the core network

Collision resolution via a backoff timer, especially used to prevent possible situations of collision between cloned SIM cards (or: to prevent possible situations of collision between user equipments and/or MTC devices using subscriber identity clones modules.

During the attach procedure of a device, the core network will check, if the used SIM card is cloned. If the card is cloned and one of the clones is currently attached the mobile core network, the network resolve this collision by using a backoff timer. Therefore the attach request will be rejected and a backoff timer will be sent back to the device to inform, when a next attach request would be allowed.

According to the present invention, for each subsequent incoming attachment request, the core network will indicate to each cloned SIM card a different waiting time interval (comparable to a timeslot for the connection with the mobile network) and will manage the connection requests, e.g. in a dedicated queue. The placement in the queue is done by sending a corresponding backoff time value (i.e. the waiting time information indicating the waiting time interval) back the corresponding cloned SIM card. By using this queue, incoming (initial) attach requests are distributed overtime in a way that the chances of respectively second attach requests are enhance and collisions are prevented as much as possible—even if several clones of the same SIM card want to attach at the same time.

The usage of a backoff timer or waiting time interval does not lead to a service degradation, because the information such a device (using a cloned SIM card) transmits is normally not time critical. However, according to the present invention, in case that a given device (user equipment and/or MTC device) has not been able to attach to the mobile communication network for several times, the device could signal a higher priority to the core network (with the respective attachment request) during the next attach attempt to gain priority.

Preferably, the backoff timer (or waiting time interval) can be adjusted by the core network depending on the usage scenario of the cloned card pool (or group of cloned subscriber identity modules) or the requested APN (Access Point Name). Thereby, it is advantageously possible according to the present invention, that the usage of cloned SIM cards is possible in more scenarios compared to a mobile communication network that does not use an embodiment of the inventive method, such as, e.g., use cases which require a higher frequency of attachment requests but a shorter attachment time interval.

According to the present invention, an embodiment of the inventive method could, e.g., be implemented in MME (Mobile Management Entity) or SGSN (Serving GPRS (General Packet Radio Service) Support Node) with the mobile core network 120.

According to a preferred embodiment of the present invention, in the second step, the waiting time interval is computed such that the waiting time interval is derived from a waiting time constant, the waiting time constant being associated to the group of cloned subscriber identity modules and the waiting time constant especially corresponding to one out of the following:

the typical attachment time normally needed for exchanging the predetermined volume of data between a user equipment and/or an MTC device comprising a subscriber identity module of the group of cloned subscriber identity modules, the sum of, on the one hand, the typical attachment time normally needed for exchanging the predetermined volume of data between a user equipment and/or an MTC device comprising a subscriber identity module of the group of cloned subscriber identity modules, and, on the other hand, an idle time interval.

According to the present invention, it is thereby advantageously possible that a reliable yet flexible mode of operation is possible to achieve using the group of cloned subscriber identity modules, as the waiting time interval are individually transmitted to the user equipments/MTC devices such that a complicated and inflexible pre-provisioning of the user equipments/MTC devices with waiting time intervals or corresponding information is not necessary. It is advantageous to choose (by adding an idle time interval to the typical attachment time normally needed for exchanging the predetermined volume of data between a user equipment and/or an MTC device) the waiting time constant—at least to some extent—longer than absolutely necessary. This enhances robustness as well possible flexibility when using the group of cloned subscriber identity modules as it is possible for the mobile communication network to influence on the order in which the different subscriber identity modules are served (regarding attachment granted to the mobile communication network).

According to another preferred embodiment of the present invention, besides the first cloned subscriber identity module and the second cloned subscriber identity module, the group of cloned subscriber identity modules comprises at least a third cloned subscriber identity module, wherein in case that—in a fourth step—attachment to the mobile communication network is requested—using the third cloned subscriber identity module—by a corresponding user equipment and/or an MTC device sending a further first attachment request while the user equipment and/or the MTC device corresponding to the first cloned subscriber identity modules is still attached to the mobile communication network, the method furthermore comprises a fifth step and a sixth step, wherein in the fifth step, subsequent to the first step, the further first attachment request is rejected by the mobile communication network and a further waiting time information indicative of a further waiting time interval is transmitted, by the mobile communication network, to the user equipment and/or the MTC device corresponding to the third cloned subscriber identity module, and wherein in the sixth step, subsequent to the fifth step, attachment to the mobile communication network is requested, by the user equipment and/or the MTC device corresponding to the third cloned subscriber identity module, using a further second attachment request, the further second attachment request being sent after the further waiting time interval has elapsed, wherein the end of the further waiting time interval differs from the end of the waiting time interval preferably by the waiting time constant.

According to the present invention, it is thereby advantageously possible to indicate a respective waiting time interval to a plurality of different user equipments/MTC devices corresponding to cloned subscriber identity modules, wherein the respective waiting time intervals are preferably spaced by the waiting time interval.

According to a preferred embodiment of the present invention, an urgency information is included either in the first attachment request—in the first step—or in the further first attachment request—in the fourth step—, wherein the urgency information of the respective attachment request is indicative of an urgent need, of the respective user equipment and/or the MTC device—corresponding to the second cloned subscriber identity module or to the third cloned subscriber identity module—to be attached to the mobile communication network, wherein the waiting time interval indicated by the waiting time information—transmitted in the second step to the user equipment and/or the MTC device corresponding to the second cloned subscriber identity module—
or
the further waiting time interval indicated by the further waiting time information—transmitted in the fourth step to the user equipment and/or the MTC device corresponding to the third cloned subscriber identity module—
corresponds either to the waiting time constant decreased by the elapsed time of attachment of the user equipment and/or the MTC device corresponding to the first cloned subscriber identity module,
or to the typical attachment time normally needed for exchanging the predetermined volume of data between a user equipment and/or an MTC device comprising a subscriber identity module of the group of cloned subscriber identity modules, decreased by the elapsed time of attachment of the user equipment and/or the MTC device corresponding to the first cloned subscriber identity module.

According to the present invention, it is thereby advantageously possible to provide for the attachment of an additional cloned subscriber identity module to the mobile communication network in case that urgency is indicated via the urgency information.

According to a preferred embodiment of the present invention, besides the first cloned subscriber identity module and the second cloned subscriber identity module, the group of cloned subscriber identity modules comprises at least a third cloned subscriber identity module, wherein in case that attachment to the mobile communication network is requested—using the third cloned subscriber identity module—by a corresponding user equipment and/or an MTC device sending a further first attachment request after the user equipment and/or the MTC device corresponding to the first cloned subscriber identity module is detached from the mobile communication network but prior to the attachment of the user equipment and/or the MTC device corresponding to the second cloned subscriber identity module, the method furthermore comprises a seventh step and an eighth step, wherein in the seventh step, subsequent to the second step, the further first attachment request is accepted by the mobile communication network, and wherein in the eighth step, subsequent to the seventh step, the second attachment request of the user equipment and/or the MTC device corresponding to the second cloned subscriber identity modules is rejected by the mobile communication network in case that the user equipment and/or the MTC device corresponding to the third cloned subscriber identity module is still attached to the mobile communication network, wherein a modified waiting time information indicative of a modified waiting time interval—the modified waiting time information and the modified waiting time interval being modified with respect to the context of the second step—is transmitted, by the mobile communication network, to the user equipment and/or the MTC device corresponding to the second cloned subscriber identity module.

According to the present invention, it is thereby advantageously possible to provide a certain degree of flexibility such that an additional cloned subscriber identity module requesting attachment (and not being in the queue of different waiting time intervals) can be served.

According to a preferred embodiment of the present invention, the data exchanged with the mobile communication network using the group of cloned subscriber identity modules comprises at least one out of the following:
smart meter related information,
intelligent home related information,
activation data for at least one additional subscriber identity module per user equipment and/or MTC device.

In an exemplary embodiment, the present invention provides a system for exchanging data between user equipments and/or MTC devices with a mobile communication network using at least one group of cloned subscriber identity modules, the system comprising the user equipments and/or MTC devices, the group of cloned subscriber identity modules, and the mobile communication network, the mobile communication network comprising an access network and a core network,
wherein the group of cloned subscriber identity modules comprises a plurality of separate subscriber identity modules, each having an assigned IMSI (International Mobile Subscriber Identity) and an assigned MSISDN (Mobile Subscriber Integrated Services Digital Network Number), the assigned IMSI and/or the assigned MSISDN being identical for the subscriber identity modules of the group of cloned subscriber identity modules,
wherein the group of cloned subscriber identity modules is associated to a group of user equipments and/or MTC devices (machine type communication devices), each of these user equipments and/or MTC devices comprising at least one subscriber identity module of the group of cloned subscriber identity modules, wherein the user equipments and/or MTC devices are preferably used to exchange—during at least one period of attachment to the mobile communication network—a predetermined volume of data with the mobile communication network,
wherein the group of cloned subscriber identity modules comprises at least a first cloned subscriber identity module and a second cloned subscriber identity module, wherein in case that the user equipment and/or the MTC device corresponding to the first cloned subscriber identity module is already attached to the mobile communication network the system is configured such that:
attachment to the mobile communication network is requested—using the second cloned subscriber identity module—by a corresponding user equipment and/or MTC device sending a first attachment request,
the first attachment request is rejected by the mobile communication network and a waiting time information indicative of a waiting time interval is transmitted, by the mobile communication network, to the user equipment and/or the MTC device corresponding to the second cloned subscriber identity module,
attachment to the mobile communication network is requested, by the user equipment and/or the MTC device corresponding to the second cloned subscriber identity module, using a second attachment request, the second attachment request being sent after the waiting time interval has elapsed.

According to the present invention, it is thereby advantageously possible to provide a system that is simple, flexible, robust and cost effective for serving a group of cloned subscriber identity modules.

According to a preferred embodiment of the present invention, besides the first cloned subscriber identity module and the second cloned subscriber identity module, the group of cloned subscriber identity modules comprises at least a third cloned subscriber identity module, wherein the system is configured such that in case that attachment to the mobile communication network is requested—using the third cloned subscriber identity module—by a corresponding user equipment and/or an MTC device sending a further first attachment request while the user equipment and/or the MTC device corresponding to the first cloned subscriber identity modules is still attached to the mobile communication network, the further first attachment request is rejected by the mobile communication network and a further waiting time information indicative of a further waiting time interval is transmitted, by the mobile communication network, to the user equipment and/or the MTC device corresponding to the third cloned subscriber identity module, and wherein attachment to the mobile communication network is requested, by the user equipment and/or the MTC device corresponding to the third cloned subscriber identity module, using a further second attachment request, the further second attachment request being sent after the further waiting time interval has elapsed, wherein the end of the further waiting time interval differs from the end of the waiting time interval preferably by the waiting time constant.

According to a preferred embodiment of the present invention, an urgency information is included either in the first attachment request or in the further first attachment request, wherein the urgency information of the respective attachment request is indicative of an urgent need, of the respective user equipment and/or the MTC device—corresponding to the second cloned subscriber identity module or to the third cloned subscriber identity module—, to be attached to the mobile communication network, wherein the waiting time interval indicated by the waiting time information—transmitted to the user equipment and/or the MTC device corresponding to the second cloned subscriber identity module— or the further waiting time interval indicated by the further waiting time information—transmitted to the user equipment and/or the MTC device corresponding to the third cloned subscriber identity module— corresponds either to the waiting time constant decreased by the elapsed time of attachment of the user equipment and/or the MTC device corresponding to the first cloned subscriber identity module, or to the typical attachment time normally needed for exchanging the predetermined volume of data between a user equipment and/or an MTC device comprising a subscriber identity module of the group of cloned subscriber identity modules, decreased by the elapsed time of attachment of the user equipment and/or the MTC device corresponding to the first cloned subscriber identity module.

According to still a further preferred embodiment of the present invention, it is preferred that, besides the first cloned subscriber identity module and the second cloned subscriber identity module, the group of cloned subscriber identity modules comprises at least a third cloned subscriber identity module, wherein the system is configured such that in case that attachment to the mobile communication network is requested—using the third cloned subscriber identity module—by a corresponding user equipment and/or an MTC device sending a further first attachment request after the user equipment and/or the MTC device corresponding to the first cloned subscriber identity module is detached from the mobile communication network but prior to the attachment of the user equipment and/or the MTC device corresponding to the second cloned subscriber identity module, the further first attachment request is accepted by the mobile communication network, and the second attachment request of the user equipment and/or the MTC device corresponding to the second cloned subscriber identity modules is rejected by the mobile communication network in case that the user equipment and/or the MTC device corresponding to the third cloned subscriber identity module is still attached to the mobile communication network, wherein a modified waiting time information indicative of a modified waiting time interval—the modified waiting time information and the modified waiting time interval being modified with respect to the context of the second step—is transmitted, by the mobile communication network, to the user equipment and/or the MTC device corresponding to the second cloned subscriber identity module.

It is furthermore preferred that each of the user equipments and/or MTC devices corresponding to the group of cloned subscriber identity modules comprises—besides a cloned subscriber identity module of the group of cloned subscriber identity modules—a further subscriber identity module such that activation information regarding the further subscriber identity module is exchanged using the group of cloned subscriber identity modules.

In an exemplary embodiment, the present invention provides a mobile communication network and/or a user equipment and/or MTC device exchanging data between a plurality of user equipments and/or MTC devices and the mobile communication network in a system according to the present invention.

In an exemplary embodiment, the present invention provides a program comprising a computer readable program code which, when executed on a computer or on a user equipment or on an MTC device or on a network component of a mobile communication network or in part on a user equipment and/or an MTC device and in part on a network component of a mobile communication network, causes the computer or the user equipment and/or the MTC device and/or the network component of the mobile communication network to perform a method according to the present invention.

In an exemplary embodiment, the present invention provides a computer program product for using a user equipment and/or an MTC device with a mobile communication network, the computer program product comprising a computer program stored on a storage medium, the computer program comprising program code which, when executed on a computer or on a user equipment or on an MTC device or on a network component of a mobile communication network or in part on a user equipment and/or an MTC device and in part on a network component of a mobile communication network, causes the computer or the user equipment and/or the MTC device and/or the network component of the mobile communication network to perform a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a system for exchanging data with a mobile communication network 100, especially transmitting machine type communication data. The data are exchanged between, on the one hand, a group 40 (represented by a dashed line) of cloned subscriber identity modules (or user equipment and/or MTC devices corresponding to these cloned subscriber identity modules), and, on the other hand, the mobile communication network 100. The mobile communication network 100 is especially a public land mobile network. The mobile communication network 100 comprises an access network 110 and a core network 120 (the core network 120 being only schematically shown by means of a cloud representation) and is preferably a cellular telecommunications network comprising typically a plurality of network radio cells, two of which are represented in FIG. 1 by means of solid lines and reference signs 11 and 12, and each radio cell being served by a base station entity 111, 112. In the example represented in FIG. 1, the group 40 of cloned subscriber identity modules comprises a first cloned subscriber identity module 21, a second cloned subscriber identity module 22, and a third cloned subscriber identity module 23, each being part of a corresponding user equipment and/or MTC device (not represented by a reference sign). It is to be understood that the group 40 of cloned subscriber identity modules typically comprises a number of cloned subscriber identity modules (and corresponding user equipments/MTC devices) superior of three. Further user equipments and/or MTC devices served by the mobile communication network 100 are schematically shown in FIG. 1 (reference signs 24 to 28).

Figure 2:
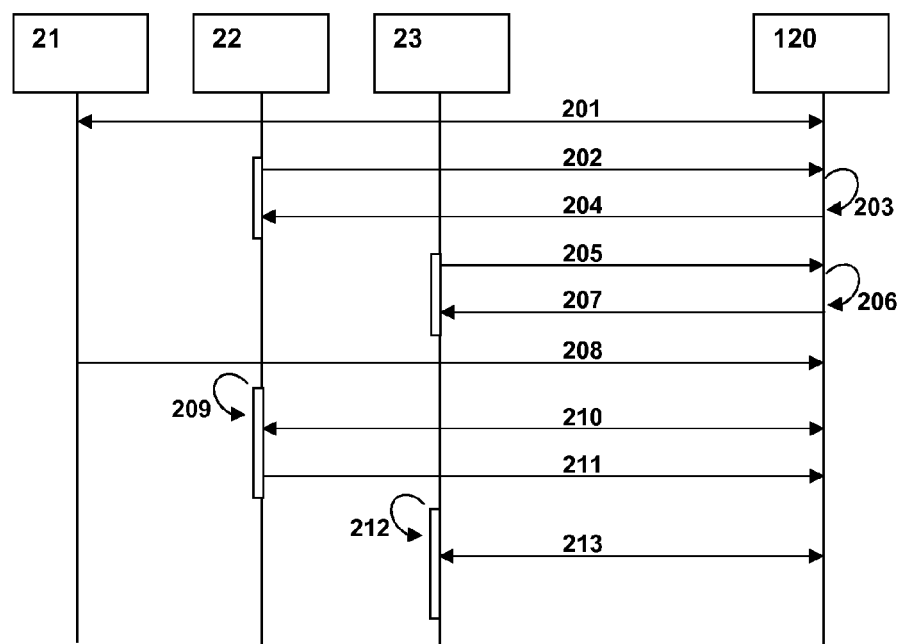
FIGS. 2 and 3 schematically illustrate communication diagrams according to the method and/or of the system according to the present invention.
Figure 3:
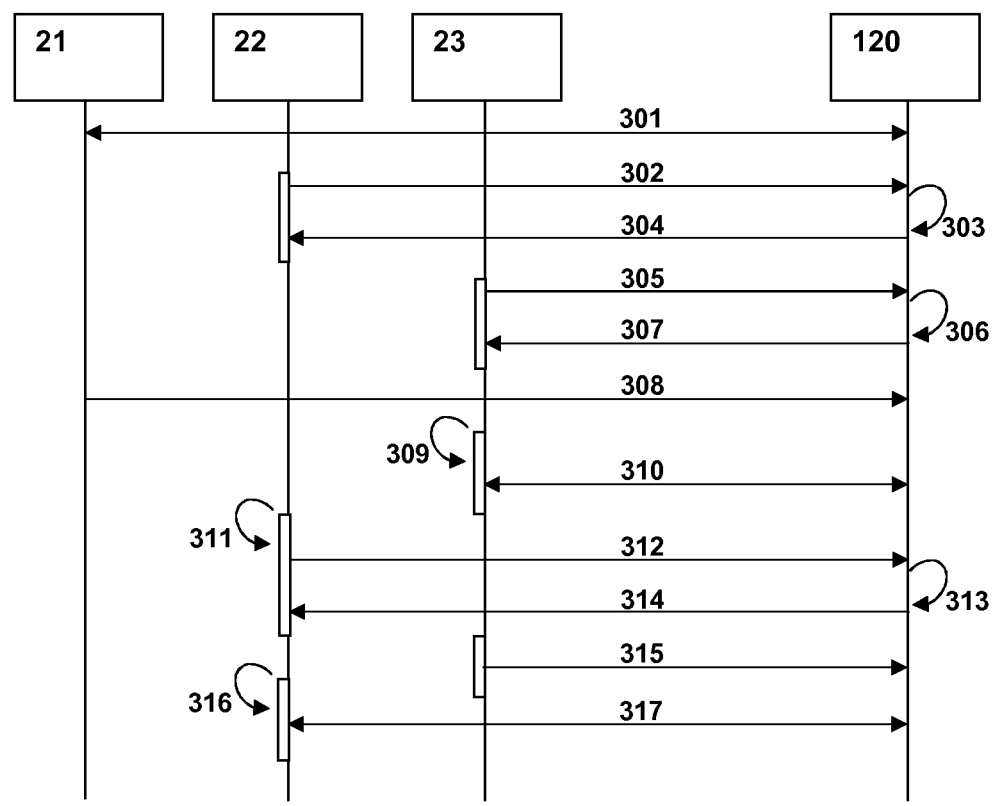

In FIGS. 2 and 3, communication diagrams according to the method and/or the system according to the present invention are schematically shown, wherein the communication between, on the one hand, the first cloned subscriber identity module 21, the second cloned subscriber identity module 22 and the third cloned subscriber identity module 23, and, on the other hand, the core network 120 is schematically shown.

In FIG. 2, a set of normal priority attachment requests are considered:

In a first processing step 201, the first cloned subscriber identity module 21 is successfully attached to the mobile core network (via requesting to be attached to the core network 120 in a preceding step);

In a second processing step 202, the second cloned subscriber identity module 22, which is belonging to the same SIM card pool as the first cloned subscriber identity module 21, is sending an attach request (first attachment request) to the core network 120, thereby realizing the first step of an embodiment of the inventive method;

In a third processing step 203, the core network 120 is aware that the first cloned subscriber identity module 21 belongs to a pool of cards (or group 40 of cloned subscriber identity modules) that are cloned; as another cloned subscriber identity module (here: the first cloned subscriber identity modules 21) is already connected to the core network 120 (or mobile communication network 100), the core network 120 calculates the waiting time interval based on the elapsed connection time of the first cloned subscriber identity module 21 and the waiting time constant (or session duration of the SIM card pool), when a next attach request should be possible;

In a fourth processing step 204, the attach request (i.e. the first attachment request of the second cloned subscriber identity module 22) is rejected and a Session Management back-off timer (i.e. the waiting time information indicative of the waiting time interval) with the specific, calculated value (calculated in the third processing step 203) is sent back to the second cloned subscriber identity module 22, thereby realizing the second step of an embodiment of the inventive method;

In a fifth processing step 205, the third cloned subscriber identity module 23 is sending an attachment request (further first attachment request) to the network 100 thereby realizing the fourth step of an embodiment of the inventive method;

In a sixth processing step 206, the mobile communication network 100 (or the core network 120) is aware that this SIM card belongs to a pool (or group 40) of cards that are cloned; as another card (here the first cloned subscriber identity module 21) is already connected to the mobile communication network 100 or core network 120, the core network 120 calculates, based on
  the connection time of the first cloned subscriber identity module 21,
  the waiting time constant (or session duration of the SIM card pool or group 40 of cloned subscriber identity modules), and
  the number of SIM cards that are already queued
when a next attach request would be possible, i.e. it calculates the further waiting time interval of the fifth step of an embodiment of the inventive method;

In a seventh processing step 207, the attach request is rejected and a Session Management back-off timer (i.e. the further waiting time information, indicative of the further waiting time interval) with the specific, calculated value (calculated in the sixth processing step 206), is transmitted back to the third cloned subscriber identity module 23, thereby realizing the fifth step of an embodiment of the inventive method;

In an eighth processing step 208, the first cloned subscriber identity module 21 is detaching from the mobile communication network 100 (or mobile core network 120);

In a ninth processing step 209, the first waiting time interval (or Session Management back-off timer) at the second cloned subscriber identity module 22 is expiring (or has elapsed);

In a tenth processing step 210, the second cloned subscriber identity module 22 is successfully attaching to the mobile core network 120 (or to the mobile communication network 100) via transmitting the second attachment request to the mobile communication network 100, thereby realizing the third step of an embodiment of the inventive method;

In an eleventh processing step 211, the second cloned subscriber identity module 22 is detaching from the mobile core network 120 (or mobile communication network 100);

In a twelfth processing step 212, the further waiting time interval (or Session Management back-off timer), transmitted to the third cloned subscriber identity module 23, is expiring or elapsing;

In a thirteenth processing step 213, the third cloned subscriber identity module 23 is successfully attaching to the mobile core network 120, via transmitting the further second attachment request to the mobile communication network 100, thereby realizing the sixth step of an embodiment of the inventive method.

In FIG. 3, the case of high priority attachment requests (including an urgency information) are considered:

In a first processing step 301, the first cloned subscriber identity module 21 is successfully attached to the mobile core network 120 (via requesting to be attached to the core network 120 in a preceding step);

In a second processing step 302, the second cloned subscriber identity module 22, which is belonging to the same SIM card pool as the first cloned subscriber identity module 21, is sending an attach request (first attachment request) to the core network 120, thereby realizing the first step of an embodiment of the inventive method;

In a third processing step 303, the core network 120 is aware that the first cloned subscriber identity module 21 belongs to a pool of cards (or group 40 of cloned subscriber identity modules) that are cloned; as another cloned subscriber identity module (here: the first cloned subscriber identity modules 21) is already connected to the core network 120 (or mobile communication network 100), the core network 120 calculates the waiting time interval based on the elapsed connection time of the first cloned subscriber identity module 21 and the waiting time constant (or session duration of the SIM card pool), when a next attach request should be possible;

In a fourth processing step 304, the attach request (i.e. the first attachment request of the second cloned subscriber identity module 22) is rejected and a Session Management back-off timer (i.e. the waiting time information indicative of the waiting time interval) with the specific, calculated value (calculated in the third processing step 303) is sent back to the second cloned subscriber identity module 22, thereby realizing the second step of an embodiment of the inventive method;

In a fifth processing step 305, the third cloned subscriber identity module 23 (which also belongs to the pool or group 40 of cloned subscriber identity modules) is sending an attachment request (further first attachment request) with high priority (i.e. comprising the urgency information) to the network 100 thereby realizing the fourth step of an embodiment of the inventive method; the high priority is necessary for the third cloned subscriber identity module 23, e.g., in case that there is an urgent need to connect to the mobile communication network 100 (or to a remote server or due to other reasons);

In a sixth processing step 306, the mobile communication network 100 (or the core network 120) is aware that this SIM card belongs to a pool (or group 40) of cards that are cloned; as another card (here the first cloned subscriber identity module 21) is already connected to the mobile communication network 100 or core network 120, the core network 120 calculates the further waiting time interval (to be transmitted to the third cloned subscriber identity module 23). As the further first attachment request comprises the urgency information (i.e. the request was sent with high priority), the value of the further waiting time interval (for the third cloned subscriber identity module 23) of the fifth step of an embodiment of the inventive method is calculated; the further waiting time interval will be shorter than waiting time interval transmitted to the second cloned subscriber identity module 22, i.e. the next SIM card in the queue;

In a seventh processing step 307, the attach request is rejected and a Session Management back-off timer (i.e. the further waiting time information, indicative of the further waiting time interval) with the specific, calculated value (calculated in the sixth processing step 306), is transmitted back to the third cloned subscriber identity module 23, thereby realizing the fifth step of an embodiment of the inventive method;

In an eighth processing step 308, the first cloned subscriber identity module 21 is detaching from the mobile communication network 100 (or mobile core network 120);

In a ninth processing step 309, the further first waiting time interval (or Session Management back-off timer) at the third cloned subscriber identity module 23 is expiring (or has elapsed);

In a tenth processing step 310, the third cloned subscriber identity module 23 is successfully attaching to the mobile core network 120 (or to the mobile communication network 100) via transmitting the further second attachment request to the mobile communication network 100, thereby realizing the sixth step of an embodiment of the inventive method;

In an eleventh processing step 311, the first waiting time interval (or Session Management back-off timer) at the second cloned subscriber identity module 22 is expiring (or has elapsed);

In a twelfth processing step 312, the second cloned subscriber identity module 22 is sending again an attach request to the core network 120, this attach request corresponding to the first attachment request, thereby realizing again the first step of an embodiment of the inventive method;

In a thirteenth processing step 313, the core network 120 is aware that the second cloned subscriber identity module 22 belongs to a pool of cards (or group 40 of cloned subscriber identity modules) that are cloned; as another cloned subscriber identity module (here: the third cloned subscriber identity modules 23) is already connected to the core network 120 (or mobile communication network 100), the core network 120 calculates the waiting time interval based on the connection time of the third cloned subscriber identity module 23 and the waiting time constant (or session duration of the SIM card pool) when a next attach request would be possible;

In a fourteenth processing step 314, the attach request (i.e. a subsequent attachment request being considered a first attachment request according to the first step of an embodiment of the inventive method) of the second cloned subscriber identity module 22 is rejected and a Session Management back-off timer (i.e. the waiting time information indicative of the waiting time interval) with the specific, calculated value (calculated in the thirteenth processing step 313) is sent back to the second cloned subscriber identity module 22, thereby realizing the second step of an embodiment of the inventive method;

In a fifteenth processing step 315, the third cloned subscriber identity module 23 is detaching from the mobile communication network 100 (or mobile core network 120);

In a sixteenth processing step 316, the first waiting time interval (or Session Management back-off timer) at the second cloned subscriber identity module 22 is expiring (or has elapsed);

In a seventeenth processing step 317, the second cloned subscriber identity module 22 is successfully attaching to the mobile core network 120 (or to the mobile communication network 100) via transmitting the second attachment request to the mobile communication network 100, thereby realizing the third step of an embodiment of the inventive method.

The waiting time interval (or Session Management back-off timer) is preferably calculated as follows:

If a waiting time interval needs to be calculated (i.e. for transmitting the waiting time information indicative of the waiting time interval in the second step of an embodiment of the inventive method) the waiting time interval corresponds to the waiting time constant;

In case that an urgency information is transmitted with the respective attachment request, the waiting time interval is decreased by a configurable value, e.g. the time elapsed since the last successful attachment of a cloned subscriber identity module of the respective group 40 of cloned subscriber identity modules;

In case that no urgency information is transmitted with the respective attachment request, the waiting time interval is increased by the value of the waiting time constant for each cloned subscriber identity module in the queue of cloned subscriber identity modules;

Afterwards, the waiting time interval is decreased by the time elapsed since the last successful attachment of a cloned subscriber identity module of the respective group 40 of cloned subscriber identity modules.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for exchanging data with a mobile communication network using a group of cloned subscriber identity modules, wherein the mobile communication network comprises an access network and a core network, wherein the group of cloned subscriber identity modules comprises a plurality of separate subscriber identity modules, each having an assigned International Mobile Subscriber Identity (IMSI) and an assigned Mobile Subscriber Integrated Services Digital Network Number (MSISDN), the assigned IMSI and/or the assigned MSISDN being identical for the subscriber identity modules of the group of cloned subscriber identity modules, wherein the group of cloned subscriber identity modules is associated to a group of user equipments and/or machine type communication (MTC) devices, each of the user equipments and/or MTC devices comprising at least one subscriber identity module of the group of cloned subscriber identity modules, wherein the group of cloned subscriber identity modules comprises a first cloned subscriber identity module and a second cloned subscriber identity module, wherein the method comprises:

in a first step, receiving, by the mobile communication network, a first attachment request from a user equipment and/or MTC device corresponding to the second cloned subscriber identity module;

in a second step, subsequent to the first step, in response to a user equipment and/or MTC device corresponding to the first cloned subscriber identity module still being attached to the mobile communication network:
rejecting, by the mobile communication network, the first attachment request, and
transmitting, by the mobile communication network, a waiting time information indicative of a waiting time interval to the user equipment and/or MTC device corresponding to the second cloned subscriber identity module; and in a third step, subsequent to the second step, receiving, by the mobile communication network, a second attachment request from the user equipment and/or MTC device corresponding to the second cloned subscriber identity module after the waiting time interval has elapsed.

2. The method according to claim 1, wherein, in the second step, the waiting time interval is computed such that the waiting time interval is derived from a waiting time constant, the waiting time constant being associated to the group of cloned subscriber identity modules and the waiting time constant corresponding to one out of the following:
a typical attachment time for exchanging a predetermined volume of data between the mobile communication network and a user equipment and/or MTC device comprising a subscriber identity module of the group of cloned subscriber identity modules; or
the sum of, on the one hand, the typical attachment time for exchanging the predetermined volume of data between the mobile communication network and a user equipment and/or MTC device comprising a subscriber identity module of the group of cloned subscriber identity modules, and, on the other hand, an idle time interval.

3. The method according to claim 1, wherein the group of cloned subscriber identity modules further comprises a third cloned subscriber identity module, and wherein the method further comprises:

in a fourth step, receiving, by the mobile communication network, a further first attachment request from a user equipment and/or MTC device corresponding to the third cloned subscriber identity module while the user equipment and/or MTC device corresponding to the first cloned subscriber identity modules is still attached to the mobile communication network;

in a fifth step, subsequent to the fourth step, rejecting, by the mobile communication network, the further first attachment request and transmitting, by the mobile communication network, a further waiting time information indicative of a further waiting time interval to the user equipment and/or MTC device corresponding to the third cloned subscriber identity module; and in a sixth step, subsequent to the fifth step, receiving, by the mobile communication network, a further second attachment request from the user equipment and/or MTC device corresponding to the third cloned subscriber identity module after the further waiting time interval has elapsed, wherein the end of the further waiting time interval differs from the end of the waiting time interval.

4. The method according to claim 1, wherein urgency information is included either in the first attachment request or in the further first attachment request, wherein the urgency information of the respective attachment request is indicative of an urgent need of the respective user equipment and/or MTC device to be attached to the mobile communication network, and wherein the waiting time interval or the further waiting time interval corresponds to:
a waiting time constant decreased by an elapsed time of attachment of the user equipment and/or MTC device corresponding to the first cloned subscriber identity module, or
a typical attachment time for exchanging a predetermined volume of data between the mobile communication network and a user equipment and/or MTC device comprising a subscriber identity module of the group of cloned subscriber identity modules, decreased by the elapsed time of attachment of the user equipment and/or MTC device corresponding to the first cloned subscriber identity module.

5. The method according to claim 1, wherein the group of cloned subscriber identity modules further comprises a third cloned subscriber identity module, wherein the method further comprises:
receiving, by the mobile communication network, a further first attachment request from a user equipment and/or MTC device corresponding to the third cloned subscriber identity after the user equipment and/or MTC device corresponding to the first cloned subscriber identity module is detached from the mobile communication network but prior to attachment of the user equipment and/or MTC device corresponding to the second cloned subscriber identity module;
accepting, by the mobile communication network, the further first attachment request; and
rejecting, by the mobile communication network, the second attachment request of the user equipment and/or MTC device corresponding to the second cloned subscriber identity module in case that the user equipment and/or MTC device corresponding to the third cloned subscriber identity module is still attached to the mobile communication network, and transmitting, by the mobile communication network, a modified waiting time information to the user equipment and/or MTC device corresponding to the second cloned subscriber identity module.

6. The method according to claim 1, wherein the mobile communication network exchanges data with the user equipments and/or MTC devices comprising at least one subscriber identity module of the group of cloned subscriber identity modules, wherein the data includes: smart meter related information, intelligent home related information, and/or activation data for at least one additional subscriber identity module per user equipment and/or MTC device.

7. A system for exchanging data between a mobile communication network and user equipments and/or machine type communication (MTC) devices using a group of cloned subscriber identity modules, the system comprising:
the user equipments and/or MTC devices;
the group of cloned subscriber identity modules; and
the mobile communication network, the mobile communication network comprising an access network and a core network;
wherein the group of cloned subscriber identity modules comprises a plurality of separate subscriber identity modules, each having an assigned International Mobile Subscriber Identity (IMSI) and an assigned Mobile Subscriber Integrated Services Digital Network Number (MSISDN), the assigned IMSI and/or the assigned MSISDN being identical for the subscriber identity modules of the group of cloned subscriber identity modules;
wherein the group of cloned subscriber identity modules is associated to a group of user equipments and/or MTC devices, each of these user equipments and/or MTC devices comprising at least one subscriber identity module of the group of cloned subscriber identity modules;
wherein the group of cloned subscriber identity modules comprises a first cloned subscriber identity module and a second cloned subscriber identity module;
wherein a user equipment and/or MTC device corresponding to the second cloned subscriber identity module is configured to send a first attachment request to the mobile communication network using the second cloned subscriber identity module;
wherein the mobile communication network is configured to, in response to a user equipment and/or MTC device corresponding to the first cloned subscriber identity module still being attached to the mobile communication network:
reject the first attachment request, and
transmit a waiting time information indicative of a waiting time interval to the user equipment and/or MTC device corresponding to the second cloned subscriber identity module;
wherein the user equipment and/or MTC device corresponding to the second cloned subscriber identity module is configured to send a second attachment request to the mobile communication network after the waiting time interval has elapsed.

8. The system according to claim 7, wherein the waiting time interval is derived from a waiting time constant, the waiting time constant being associated to the group of cloned subscriber identity modules and the waiting time constant corresponding to one out of the following:
a typical attachment time for exchanging a predetermined volume of data between the mobile communication network and a user equipment and/or MTC device comprising a subscriber identity module of the group of cloned subscriber identity modules; or
the sum of, on the one hand, the typical attachment time for exchanging the predetermined volume of data between the mobile communication network and a user equipment and/or MTC device comprising a subscriber identity module of the group of cloned subscriber identity modules, and, on the other hand, an idle time interval.

9. The system according to claim 7, wherein the group of cloned subscriber identity modules further comprises a third cloned subscriber identity module;
wherein a user equipment and/or MTC device corresponding to the third cloned subscriber identity module is configured to send a further first attachment request to the mobile communication network;
wherein the mobile communication network is configured to reject the further first attachment request while the user equipment and/or MTC device corresponding to the first cloned subscriber identity modules is still attached to the mobile communication network, and to transmit a further waiting time information indicative of a further waiting time interval to the user equipment and/or MTC device corresponding to the third cloned subscriber identity module; and
wherein the user equipment and/or MTC device corresponding to the third cloned subscriber identity module is configured to send a further second attachment request after the further waiting time interval has elapsed, wherein the end of the further waiting time interval differs from the end of the waiting time interval.

10. The system according to claim 7, wherein urgency information is included either in the first attachment request or in the further first attachment request, wherein the urgency information of the respective attachment request is indicative of an urgent need of the respective user equipment and/or MTC device to be attached to the mobile communication network, and wherein the waiting time interval or the further waiting time interval corresponds to:

a waiting time constant decreased by an elapsed time of attachment of the user equipment and/or MTC device corresponding to the first cloned subscriber identity module; or a typical attachment time for exchanging a predetermined volume of data between the mobile communication network and a user equipment and/or MTC device comprising a subscriber identity module of the group of cloned subscriber identity modules, decreased by the elapsed time of attachment of the user equipment and/or MTC device corresponding to the first cloned subscriber identity module.

11. The system according to claim 7, wherein the group of cloned subscriber identity modules further comprises a third cloned subscriber identity module;

wherein a user equipment and/or MTC device corresponding to the third cloned subscriber identity module is configured to send a further first attachment request after the user equipment and/or MTC device corresponding to the first cloned subscriber identity module is detached from the mobile communication network but prior to attachment of the user equipment and/or MTC device corresponding to the second cloned subscriber identity module;

wherein the mobile communication network is configured to accept the further first attachment request, to reject the second attachment request of the user equipment and/or MTC device corresponding to the second cloned subscriber identity module in case that the user equipment and/or MTC device corresponding to the third cloned subscriber identity module is still attached to the mobile communication network, and to transmit a modified waiting time information indicative of a modified waiting time interval to the user equipment and/or MTC device corresponding to the second cloned subscriber identity module.

12. The system according to claim 7, wherein each of the user equipments and/or MTC devices corresponding to the group of cloned subscriber identity modules comprises a further subscriber identity module such that activation information regarding the further subscriber identity module is able to be exchanged using the group of cloned subscriber identity modules.

13. A non-transitory, computer-readable medium having processor-executable instructions stored thereon for a method for exchanging data with a mobile communication network using a group of cloned subscriber identity modules, wherein the mobile communication network comprises an access network and a core network, wherein the group of cloned subscriber identity modules comprises a plurality of separate subscriber identity modules, each having an assigned International Mobile Subscriber Identity (IMSI) and an assigned Mobile Subscriber Integrated Services Digital Network Number (MSISDN), the assigned IMSI and/or the assigned MSISDN being identical for the subscriber identity modules of the group of cloned subscriber identity modules, wherein the group of cloned subscriber identity modules is associated to a group of user equipments and/or machine type communication (MTC) devices, each of the user equipments and/or MTC devices comprising at least one subscriber identity module of the group of cloned subscriber identity modules, wherein the group of cloned subscriber identity modules comprises a first cloned subscriber identity module and a second cloned subscriber identity module, wherein the processor-executable instructions, when executed, facilitate the following:

in a first step, receiving, by the mobile communication network, a first attachment request from a user equipment and/or MTC device corresponding to the second cloned subscriber identity module;

in a second step, subsequent to the first step, in response to a user equipment and/or MTC device corresponding to the first cloned subscriber identity module still being attached to the mobile communication network:
  rejecting, by the mobile communication network, the first attachment request, and
  transmitting, by the mobile communication network, a waiting time information indicative of a waiting time interval to the user equipment and/or MTC device corresponding to the second cloned subscriber identity module; and in a third step, subsequent to the second step, receiving, by the mobile communication network, a second attachment request from the user equipment and/or MTC device corresponding to the second cloned subscriber identity module after the waiting time interval has elapsed.

* * * * *